INVENTORS.
WILLIAM H. BAEHR
BERNARD STEIN
MILTON WEINBERG
BY
ATTORNEYS

INVENTORS.
WILLIAM H. BAEHR
BERNARD STEIN
MILTON WEINBERG
BY
ATTORNEYS

INVENTORS.
WILLIAM H. BAEHR
BERNARD STEIN
MILTON WEINBERG
BY Ernest J. Weinberger
Tom M. Pease
ATTORNEYS INVENTORS.
WILLIAM H. BAEHR
BERNARD STEIN
MILTON WEINBERG
BY Ernest F. Weinberger
[signature]
ATTORNEYS INVENTORS
WILLIAM H. BAEHR
BERNARD STEIN
MILTON WEINBERG
BY Ernest F. Weinberger
John M. Pidd...
ATTORNEYS

STATE OF BINARY STAGES

| COUNT ↓ | $B_0$ | $B_1$ | $B_2$ | $B_3$ | $B_4$ | $B_5$ | $B_6$ | $B_7$ | $B_8$ | FREQ. ↓ |
|---|---|---|---|---|---|---|---|---|---|---|
| 383 | 1 | 1 | 1 | 1 | 1 | 1 | 1 | 0 | 1 | 417 |
| 384 | 0 | 0 | 0 | 0 | 0 | 0 | 0 | 1 | 1 | 416 |
| 391 | 1 | 1 | 1 | 0 | 0 | 0 | 0 | 1 | 1 | 409 |
| 392 | 0 | 0 | 0 | 1 | 0 | 0 | 0 | 1 | 1 | 408 |
| 400 | 0 | 0 | 0 | 0 | 1 | 0 | 0 | 1 | 1 | 400 |
| 408 | 0 | 0 | 0 | 1 | 1 | 0 | 0 | 1 | 1 | 392 |
| 413 | 1 | 1 | 1 | 1 | 1 | 0 | 0 | 1 | 1 | 385 |
| 416 | 0 | 0 | 0 | 0 | 0 | 1 | 0 | 1 | 1 | 384 |

Fig. 3

INVENTORS.
WILLIAM H. BAEHR
BERNARD STEIN
MILTON WEINBERG
BY Ernest F. Weinberger
John W. Pierce
ATTORNEYS United States Patent Office 3,424,988

Patented Jan. 28, 1969

3,424,988

FREQUENCY ERROR DECTECTOR FOR A POWER SUPPLY MONITOR AND BUS TRANSFER SWITCH

William H. Baehr, Uniondale, Bernard J. Stein, Jamaica, and Milton Weinberg, Plainview, N.Y., assignors, by mesne assignments, to the United States of America as represented by the Secretary of the Navy Filed Apr. 20, 1965, Ser. No. 449,662

U.S. Cl. 328—138 5 Claims

Int. Cl. H03k *5/18*

ABSTRACT OF THE DISCLOSURE

A frequency error detector for monitoring an A.C. signal includes a binary logic that continually counts a series of pulses of greater repetition rate than the monitored signal for the period of said signal. An output pulse is generated when the count fails to reach a predetermined value during said period.

This invention relates to a high speed condition responsive electronic control circuit for automatically transfer ring an auxiliary alternating current generator to load maine responsive to a fault in the frequency condition of a normal alternating current generator serving the mains and for transferring service back to the normal generator responsive to elimination of the fault condition.

The term high speed as herein contemplated is intended to mean that the detection of fault and the function of changeover must take place in a matter of a few milliseconds and within two cycles operating time. For example, with a normal 400 cycle supply the detection and changeover must take place within 5.0 milliseconds.

Power switch means providing the speed of power transfer indicated above is particularly useful where power is being supplied to ship's inertial navigation system wherein variation in frequency cannot be tolerated for the time necessary for conventional switching without developing malfunction of the navigational system.

Conventional mechanical relay controlled switches are too slow to accomplish the above results.

In accordance with applicants' invention, it is an object to provide a frequency error detector as a condition responsive electronic control means to provide switching within the high speed limit mentioned above.

A further object of the invention is to provide means for automatically transferring the mains back to the normal generator supply upon the elimination of frequency error in the normal generator.

A still further object is to provide means for varying the frequency error tolerance limits subsequent to fault such that a more rigid tolerance is employed in indicating lack of fault for reconnection of the normal generator to prevent hunting.

Another object is to provide improved high speed frequency error detector means.

Figure 1A:
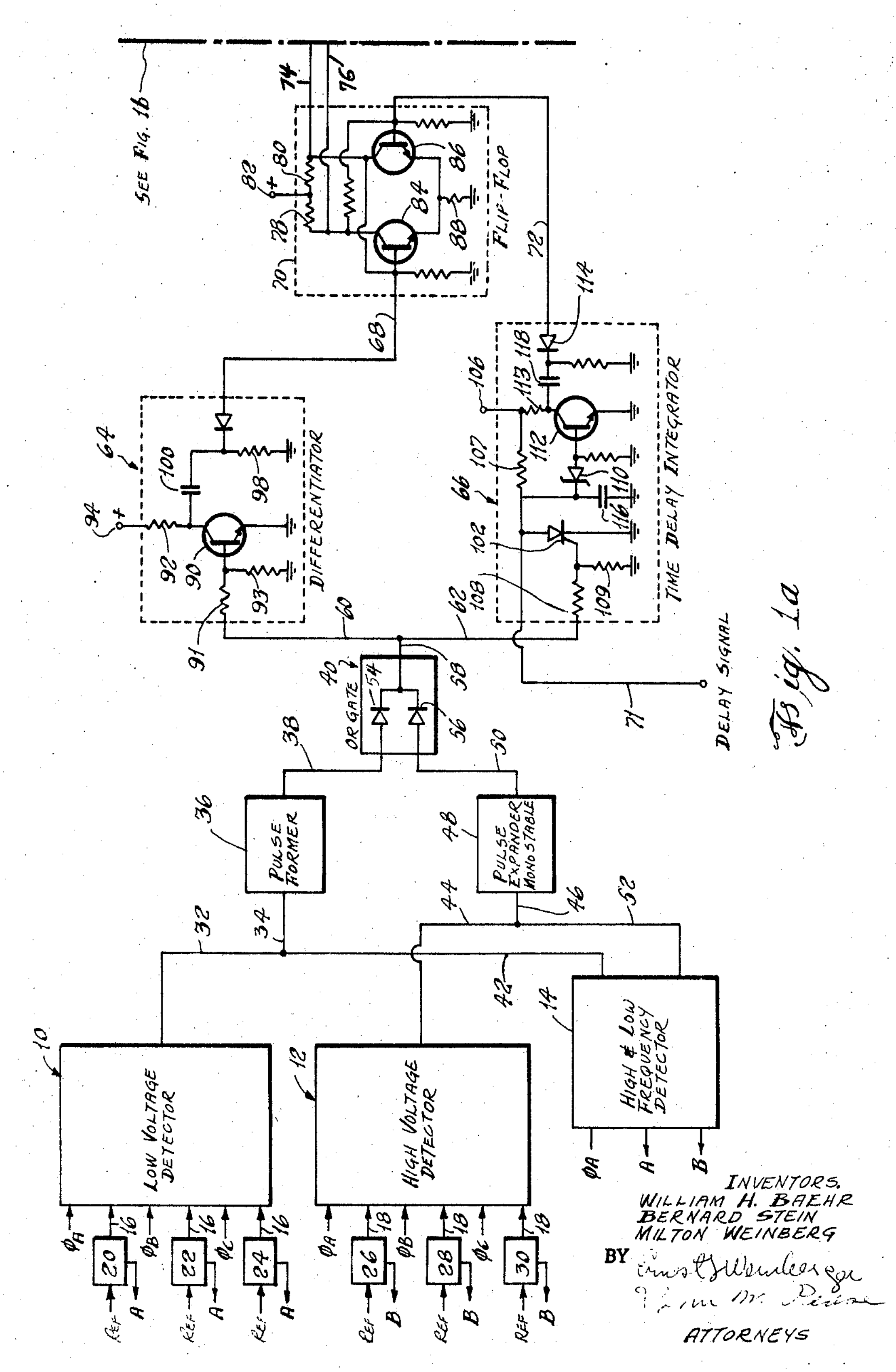
Figure 1B:
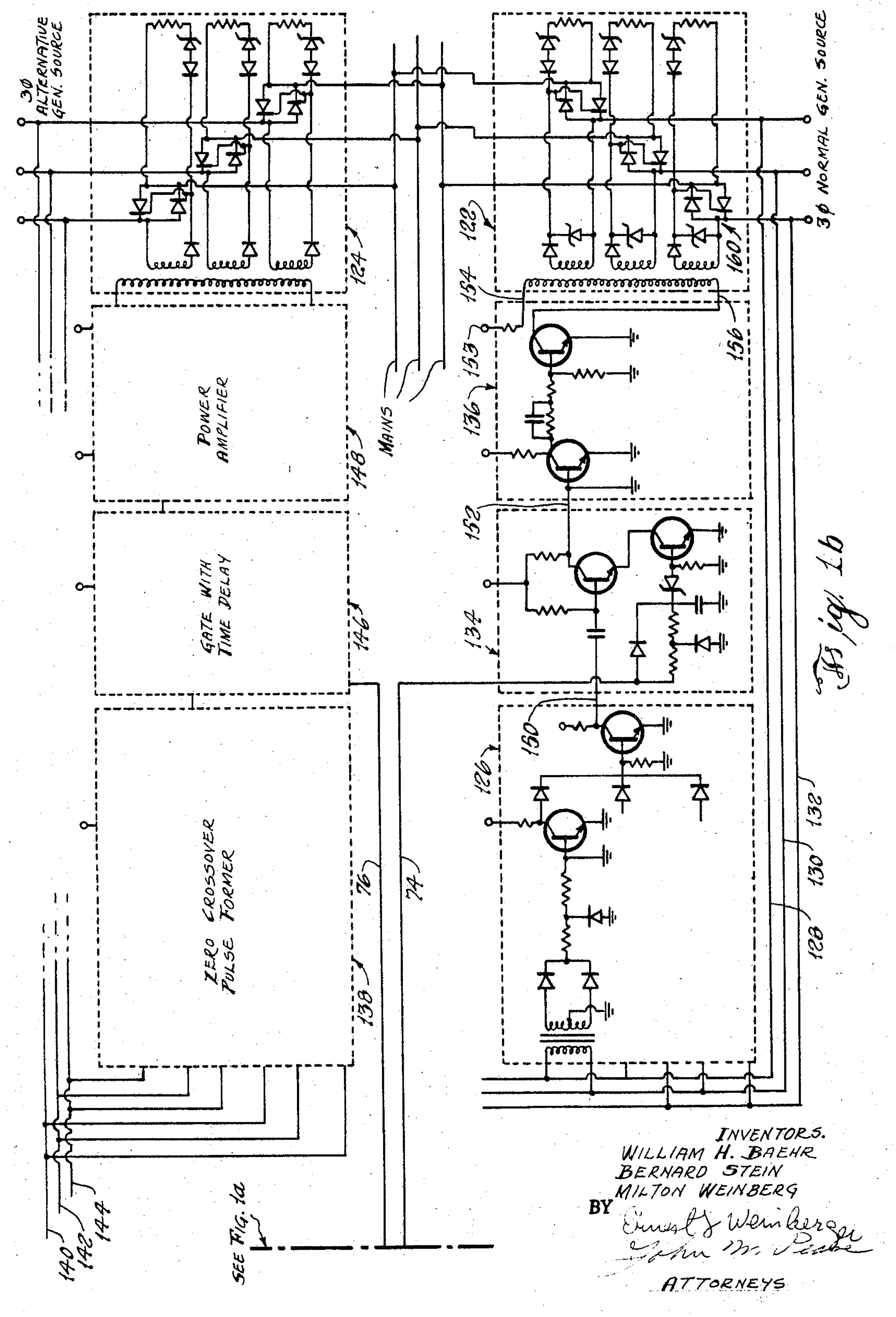

The above and other objects and advantages of the invention will be apparent to those skilled in the art from reading the following disclosure describing one exemplary embodiment of the invention and from reference to the drawings in which:

FIGS. 1*a* and 1*b* are schematic diagrams partially in block form of one system embodying the invention.

Figure 2A:
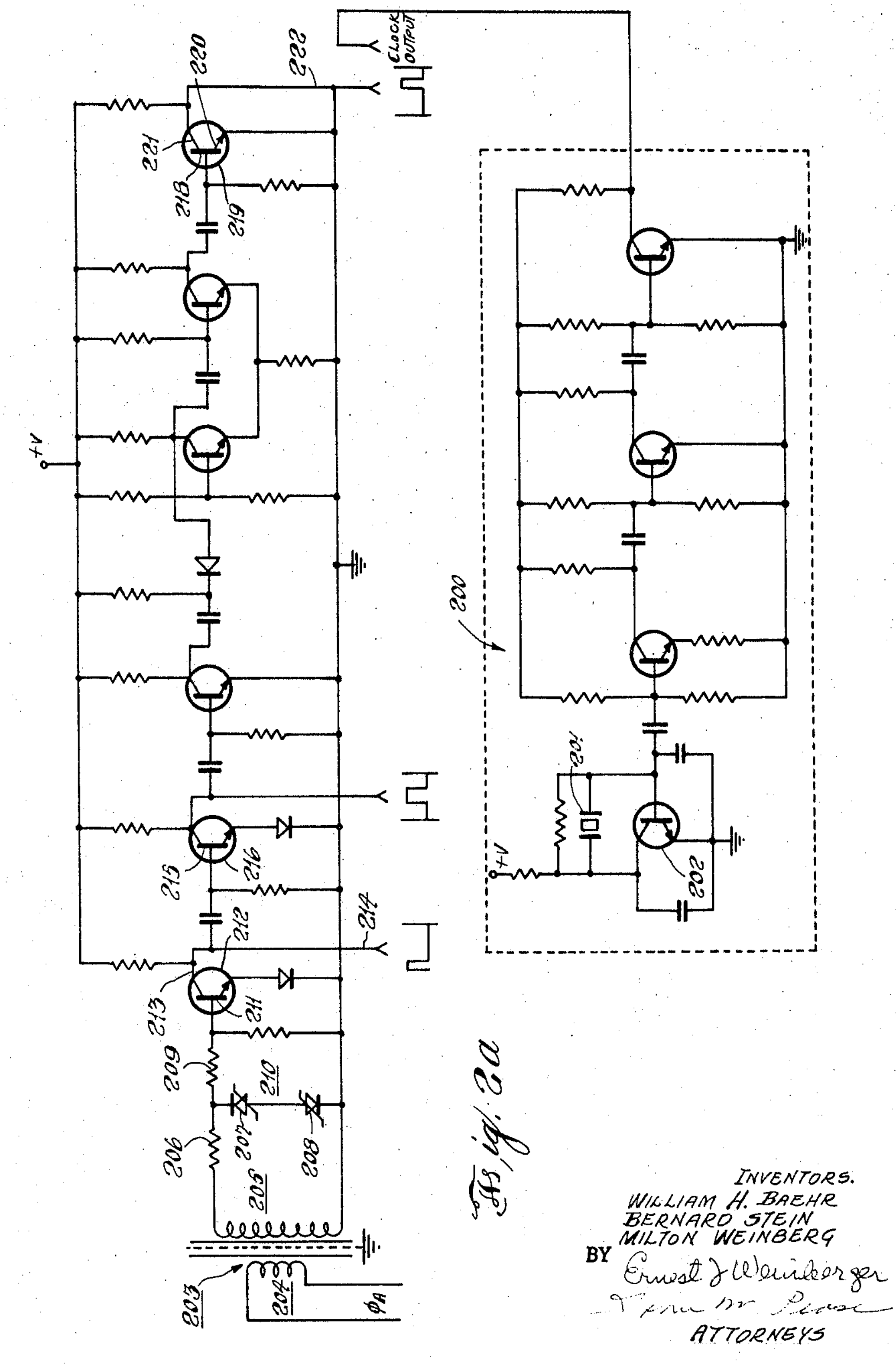
Figure 2B:
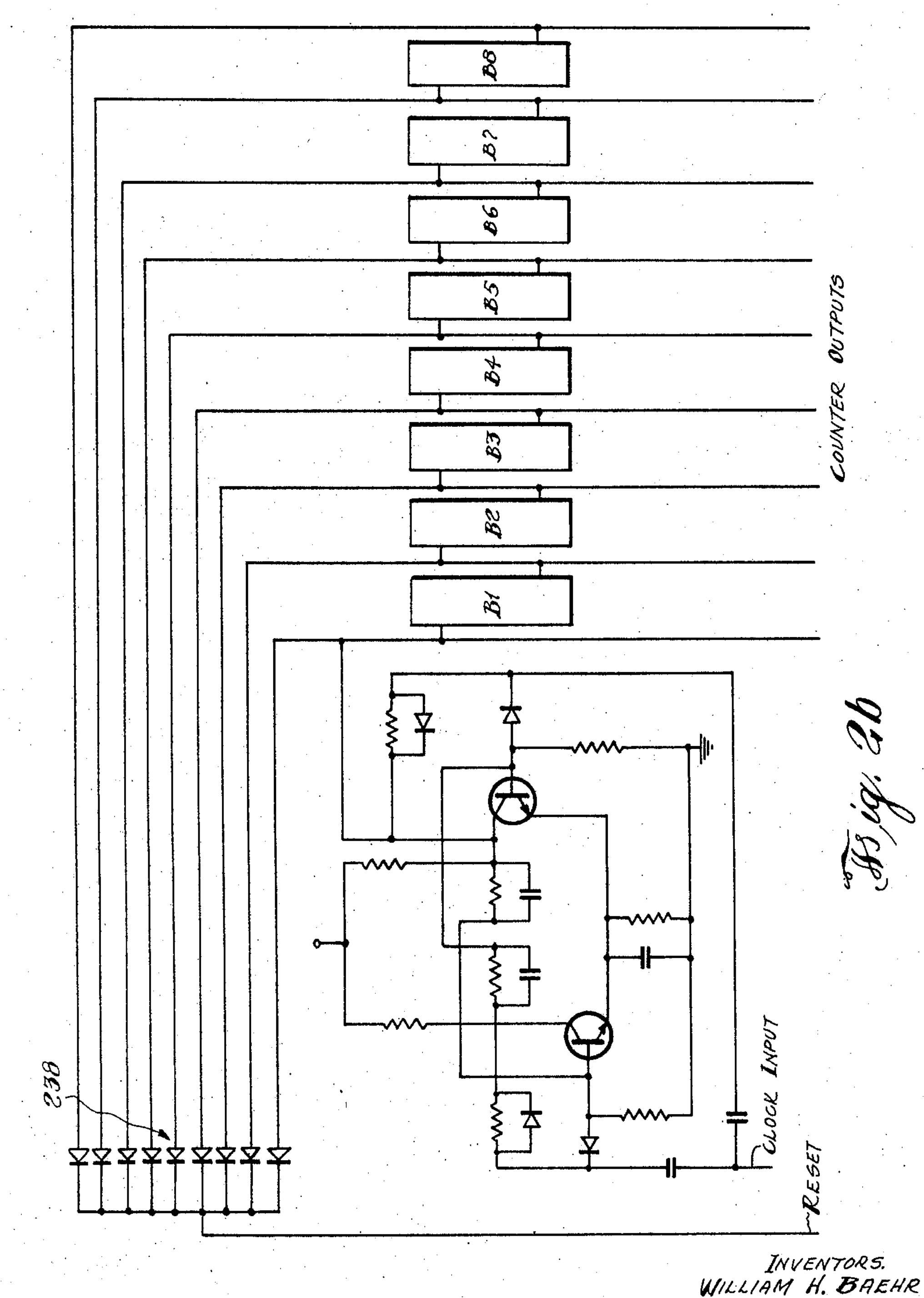
Figure 20:
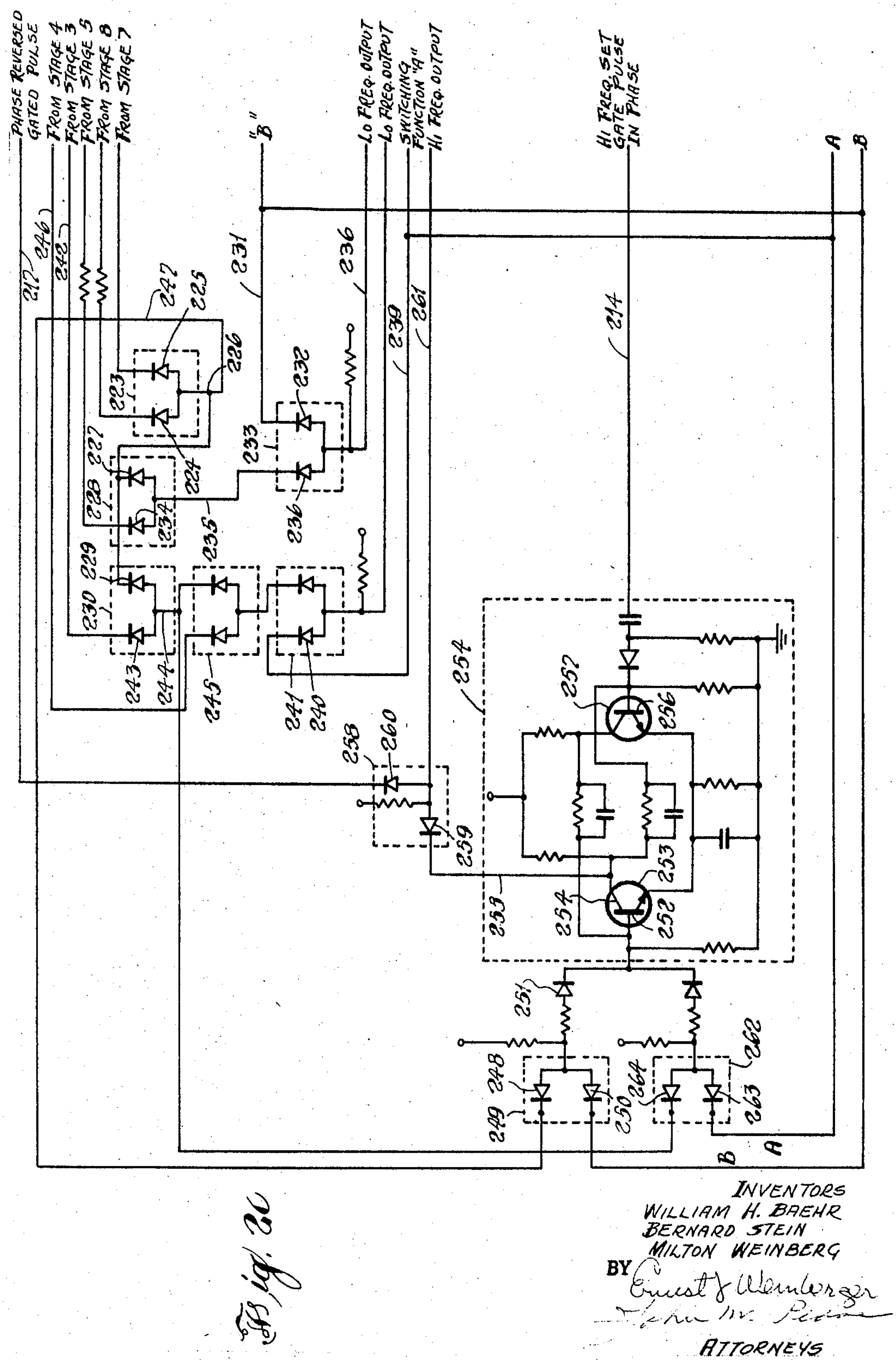

FIGS. 2*a*, *b* and *c* are detailed diagrams of an embodiment high speed frequency detection circuit made in accordance with the principle of this invention.

FIG. 3 is a table illustrating the states of the counter stages for various counts and frequency measurements.

In general, applicants' invention comprises separate on-off high speed static switch means and associated control circuits for alternately connecting normal and an alternate generator sources to common load mains, high speed voltage and frequency detection means for sensing the condition of the normal generator source and developing continuous pulse signals responsive abnormal voltage and/or frequency condition, a flip-flop circuit connected to the switch control circuits to control the on-off condition of the switch means dependent upon the condition of said flip-flop, and differentiator and integrator circuits connected to condition the flip-flop to open the normal generator switch means and close the alternator switch means responsive to said fault pulses and to condition the flip-flop to reverse the conditions of the switch means responsive to the absence of fault pulses.

Referring to the drawings in detail, FIGS. 1*a* and 1*b* show schematically the overall circuit. In FIG. 1*a* a low voltage detector 10, high voltage detector 12 and the high and low frequency detector 14 are shown in block form. The low voltage and high voltage detectors 10 and 12 are connected as indicated by the arrows identified by $\phi_A$, $\phi_B$, and $\phi_C$ to monitor separately the three phases of the $3\phi$ normal generator source indicated in FIG. 1*b*. Line transformers (not shown) reduce voltage to transistor circuit operating levels and provide isolation to permit common grounding. Each phase is rectified full wave as will be explained hereinafter and compared to D.C. reference levels 16 and 18, respectively of the low and high voltage detectors. Each reference voltage 16 is obtained from an associated gate 21, 22 and 24 in turn supplied with a reference voltage indicated and a voltage identified as A. The high voltage detector reference voltage 18 is obtained from gates 26, 28 and 30, which are each supplied with a reference voltage indicated and a voltage indicated as B.

The reason for the gates 20, 22, 24, 26, 28 and 30 and the voltages A and B will be explained hereinafter in a detailed description of the voltage detector circuits.

In the frequency detector only one phase is monitored as indicated by the arrow $\phi_A$. Reference voltages A and B are supplied to the frequency detector circuit as indicated and the reason therefor will be explained in detail hereinafter in a description of the frequency detector.

For the moment in describing the overall circuit, let it be assumed that upon the occurrence of a fault in the normal generator source a series of continuous fault pulses are transmitted as follows:

For a low voltage fault a series of fault pulses are transmitted through lines 32 and 34 and through pulse former 36 and line 38 to OR gate 40. For a high frequency fault condition, a series of pulses is transmitted through line 42, line 34, pulse former 36 and line 38 to the OR gate 40. Upon a high voltage fault condition, a series of pulses is transmitted through line 44, line 46, pulse expander monostable 48 and line 50 to the OR gate 40. Upon a low frequency fault condition, a series of pulses is transmitted through line 52, line 46, pulse expander 48 and line 50 to the OR circuit 40. The OR circuit 40 through its diodes 54 and 56 transmits the pulse signals by lines 58 and 60 and by lines 58 and 62 respectively, to a differentiator circuit 64 and an integrator circuit 66.

The output of differentiator 64 is connected by line 68 to one side of a flip-flop circuit 70. The output of integrator circuit 66 is connected by line 72 to the other side of the flip-flop circuit.

The flip-flop circuit 70 includes two output lines 74 and 76 on which voltage is to be varied responsive to a fault condition of the normal generator source to switch generators as will be described.

The flip-flop circuit 70 is per se a conventional bistable device comprising a pair of transistors 84 and 86 connected through suitable resistances between a reference voltage source 82 and a ground indicated. The bases of the transistors 84 and 86 are connected respectively to differentiator output line 68 and integrator output line 72 to selectively trigger the transistors 84 and 86 responsive to the voltage levels on lines 68 and 72 and thereby to vary the voltage levels on the flip-flop output lines 74 and 76.

Differentiator 64 is provided to condition the flip-flop 70 to provide a relative high voltage level on line 74 and a relatively low voltage on line 76 responsive to fault pulse signals from the OR gate 40.

To accomplish the above differentiator 64 comprises a transistor 90 having its emitter grounded as indicated and its collector connected through a resistor 92 to a reference voltage source 94 together with a capacitor 100 having one side connected to the collector of transistor 90 and its other side connected through a diode 94 to line 68 and through a resistor to ground, as indicated. The base of transistor 90 is connected through a resistance 91 to line 60 and through a resistor 93 to ground indicated.

In operation fault pulses from OR gate 40 condition the transistor 90 to pass current to ground, then discharging the capacitor 100 to draw current through diode 96 and lower the voltage on line 68.

Thus responsive to fault pulses from the OR gate 40, the voltage on line 68 is lowered interrupting the passage of current through the transistor 84 of flip-flop 70 to provide a relatively high voltage on line 74.

The time delay integrator circuit 66 is provided to lower the voltage level on line 76 responsive to lack of fault pulse from OR gate 40 and to raise the voltage level on line 76 responsive to fault pulses from the OR gate 40 by controlling the condition of flip-flop transistor 86 through the integrator output line 72.

To accomplish the above the integrator 66 is provided with a silicon control rectifier 102 having its anode connected through a resistor 107 to a reference voltage source 106, its cathode connected to ground indicated and its grid connected through resistor 108 to line 62 and through resistor 109 to ground indicated such that the current passing condition of SCR 102 may be controlled by the voltage on line 62. Integrator 66 also includes a capacitor 116 connected between the anode of SCR 102 and ground indicated, a transistor 112 having its collector connected through a resistor 113 to reference voltage source 106 and its cathode grounded as indicated. The base of transistor 112 is connected through a Zener diode 110 to the ungrounded side of capacitor 116 to condition the transistor 112 to pass current responsive to a predetermined charged condition of capacitor 116. The collector of transistor 112 is connected through a capacitor 118 and diode 114 to line 72 controlling the transistor 86 of flip-flop 70.

In operation of the integrator circuit 66, a full pulse from OR gate 40 on line 62 biases the SCR 102 to pass current thus discharging the capacitor 116 such that voltage is not sufficient to pass the Zener diode 110. Thus the transistor 112 is in current interrupting condition and the voltage on line 72 is sufficiently high to bias the flip-flop 70 transistor 86 to current passing condition, thereby lowering the voltage on the flip-flop output line 76.

Upon lack of fault signal from OR gate 40 the reverse conditions take place. That is is SCR 102 is in current interruption condition, capacitor 116 progressively charges to a peak voltage sufficient to pass the Zener diode 110, transistor 112 is thus conditioned to pass current discharging capacitor 118 to lower voltage on line 72 and thereby interrupting current in transistor 86 of flip-flop 70 and raising the level of voltage on output line 76 of the flip-flop.

As shown in FIG. 1*b*, the normal generator source indicated is connected to the load mains 120 by an SCR switch means 122 and the alternate generator source indicated is connected to the load mains by an SCR switch means 124. It is to be understood that any high speed electronic switch means can be used for switching including thyratron tubes.

Switching control of SCR 122 is obtained from the voltage on line 74 through a switching control circuit including a zero cross-over pulse former 126 electrically energized from the normal generator source through lines 128, 130 and 132, a gate with time delay 134 and a power amplifier 136.

Switching control of SCR 124 is obtained from voltage on line 76 through a switching control circuit including a zero crossover pulse former 138 electrically energized from the alternate generator source through lines 140, 142 and 144, a gate with time delay 146 and a power amplifier 148.

Since the control circuit for SCR switch 124 is the same as the control circuit for SCR 122, details of circuits 126, 134 and 136 only have been shown in FIG. 1*b*. Also, since circuits of the type shown in controls 126, 134 and 136 are conventional per se, a brief description of their function in relation to applicants' overall control circuit should suffice.

Briefly stated, the pulse former 126 monitors all three phases of the normal generator source, rectifies the current of each phase to produce two pulses per cycle per phase or a total of six pulses per cycle on output line 150 of the pulse former 126. Also the elements of the pulse former are selected such that the length of each pulse is about 55 degrees of the 60 degrees between zero crossover points. This is done to provide for phase shift and at the same time provide the necessary cut-off between pulses.

The pulse as above described and a direct current voltage from line 74 are supplied as inputs to the gate 134. It will be recalled that line 74 is supplied with a relatively high voltage for one condition of the flip-flop 70 and a relatively low voltage from the opposite condition of flip-flop 70. Gate 134 through its output line 152 triggers power amplifier 136 with pulse signals when the voltage on line 74 is high. The power amplifier in turn through lines 154 and 156 energizes a primary coil 158 of the SCR 122 from a voltage reference source 153 to operate the SCR switch to closed current passing condition. The SCR 122 includes rectifier elements 160 in back-to-back arrangement in each phase line, the anode voltages being controlled from pulses received from the primary coil 158.

Thus, when the voltage of line 74 is relatively high, the SCR 122 is conditioned to pass current from the normal generator source to the load mains 120. When the voltage on line 74 is relatively low the gate 134 is not triggered, the SCR switch primary coil is not energized and the SCR switch 122 is maintained in open condition.

The control circuit, elements 138, 146 and 148, of the SCR 124 operates in response to voltage level in line 76 in the same manner as described for the control circuit of SCR 122. That is, when the voltage level in line 76 is relatively high, SCR switch 124 is closed and current is passed from the alternate generator source to the load mains 120, and when the voltage level in line 76 is low, the SCR 124 is maintained in open condition.

Consider now the operation of the overall system under the condition of normal voltage and frequency of the normal generator source. Under this normal condition there is no output from the fault voltage or frequency detectors and no fault pulse on the output line 58 of the OR gate 40. In the absence of a votlage pulse on line 62, integrator 66 is activated to condition the flip-flop 70 to that condition in which the voltage level on line 74 is relatively high and the voltage level on line 76 is relatively low. The high voltage on line 74 closes SCR 122 to connect the normal generator source to the line mains 120. The relatively low voltage level on line 76 provides no means for closing the SCR switch 124 and the alternate generator source remains disconnected from the load mains 120. Let us consider next the operation of the system under a fault condition of abnormally high or low voltage condition or abnormally high or low frequency condition of the normal generator source.

Under any such fault condition, a series of fault pulses is produced on line 58 from the OR gate 40. The result of the fault pulses applied to the integrator 66 and the differentiator 64 is to reverse the condition of flip-flop 70 to lower the voltage on line 74 to its relatively low value and to raise the voltage on line 76 to its relatively high value. Relatively low voltage on line 74 removes the ON bias from SCR 122 and allows the SCR 122 to immediately disconnect the load mains 120 from the normal generator source. The relatively high voltage on line 76 establishes an ON bias to the SCR 124 through its control circuit including elements 138, 146, and 148 to close SCR 124 and connect the load mains 120 to the alternate generator source. However, the delay provided in gate 146 prevents connecting the alternate supply source to the line mains until the normal supply source is disconnected. A time delay of 1.5 milliseconds has been found satisfactory in application to a 400 cycle supply.

Assuming now that the fault in the normal generator source is corrected, the fault pulse in line 58 is thereby eliminated. However, the flip-flop 70 is returned to its normal state to transfer the load lines back to the normal load source only after a time delay provided by the time delay built into the integrator circuit 66. More particularly, when the fault in the normal generator source is removed, the output of OR 40 becomes zero, permitting the integrator 66 output to increase steadily, as capacitor 118 is changing to a point where after one second the signal on line 72 operates the flip-flop 70 to its normal state. The reason for this delay is to allow the normal generator source to become stable and avoid possible recycling. The delay in integrator 66 is adjustable in accordance to the voltage level applied to delay signal line 71. The delay in gate 134 provides the time delay in reconnecting the normal generator source which is desirable to provide time for disconnecting the alternate generator.

The system as thus far described contemplates the disconnection and reconnection of the normal generator source in relation to one fixed range of voltage tolerance and one fixed range of frequency tolerance.

The remainder of this description will disclose details of the frequency error detection circuits and means for varying the fault tolerance such that reconnection of the normal generator source requires conditions of more limited fault tolerance.

Referring now to FIGS. 2*a*, *b* and *c* wherein the frequency error detector 14 of FIG. 1*a* is illustrated in detail and receives as its inputs, one phase of the normal generator, and the tolerance control signals A and B. For matters of simplicity the low frequency detection will be explained first. Only one phase of the generator need be monitored since all the phases are at the same frequency due to the fact that the same moving parts of generator are involved for all the phases. Namely, one rotor is used for all three phases. In general the overall operation of the frequency detector is based on comparing the pulse count of a generator over a single period of the generator frequency. By employing an accurate pulse generator or clock and totalling the accumulated count for one period through resetting the counter with the power generator frequency output, continuous stable and accurate frequency monitoring is achieved.

The clock or pulse generator 200 is controlled by a crystal 201 which holds the oscillator 202 to a fixed stable frequency and is connected in the base-collector circuit thereof. The rest of the clock circuitry acts to provide sufficient signal and form the proper type of pulse. The clock output is supplied to the first logic or counter circuit $B_0$ and will be explained hereinafter.

The frequency of the main power generator is monitored by the frequency error detector by way of applying one of the phases $\phi_A$ to transformer 203 through input winding 204. The output winding 205 provides a reduced sine voltage to the squarer circuit which consists of resistor 206 and back to back Zener diodes 207 and 208.

This in addition to resistors 209 and 210 supply a series of recurring square pulses to the base 211 of transistor 212. The squarer transforms the monitored sine wave voltage into a series of pulses at the collector 213 of transistor 212 which are applied to line 214 and to the base 215 of transistor 216 which merely acts to shift the pulse phase 180° at line 217 thus providing a pair of pulse outputs 180° out of phase with one another and with the pulse train at line in phase with the input $\phi_A$. The rest of circuit properly shapes the pulses in the reset portion thereof which appears as an output on line in the form of a train as in the input at base 218 of transistor 219. The emitter 220 of this transistor is connected to ground while the collector 221 is connected to output line 222. Under these conditions each pulse applied to the base 218 effectively shorts the collector 221 to the emitter 220 or grounds the output line 222. This line 222 is designated as the reset output since it shorts out, for every pulse, the counters as explained hereinafter.

The output pulses from the clock 200 are applied to logic circuit or counter $B_0$ which is in the form of a flip-flop circuit capable of assuming two stable states (i.e. 0, 1). The entire counter being composed of a plurality of such stages connected in series or tandem and designated as $B_0$, $B_1$ . . . $B_8$ with a total, as for example, of 9 stages. Each input pulse changes the state of the flip-flop to which it is applied so that if the first clock pulse changes $B_0$ from 0 to 1 then the next clock pulse changes $B_0$ from 1 to 0 and $B_1$ from 0 to 1. This process continues to progressively change the states of the individual logic circuits. Represented in FIG. 3, by way of tabular reference, the state of each stage is represented for the total accumulated number of clock pulses or counts as shown. If the pulse repetition rate of the clock were 400 pulses for each cycle ($400_c$) of the monitored generator or 160,000 cycles per second then for each cycle of the monitored generator, if the frequency were exactly 400 c./s., then the accumulated count would be 400 as shown, and would correspond to a frequency of 400 c./s.

It should be noted from the table of FIG. 3 that for frequencies from 384 to 416 c./s., both the $B_7$ and $B_8$ stages are in the "1" state and for a frequency above 416 c./s., $B_7$, is n the "0" state. Further, that if stage $B_5$ is in the "1" state then the frequency is below 384 c./s. Since these are individual counter circuits, the states thereof for each frequency are unique. In general if the accumulated counts between resettings of the counter reaches a predetermined valve the frequency is correct; if the accumulated count is low, the frequency is too high and if the count is high the frequency is too low. Considering a nominal 400 cycle power generator, the period is 0.0025 second and employing a clock generator with a repetition rate of 160,000 per second the accumulated count will be 400 for 400 cycles. Tolerating a difference to say ±16 cycles per second in the nominal frequency, then the allowable frequency excursion extends from 384 to 416 c.p.s. The binary representation of FIG. 3 indicates that for this range (384–416 c.p.s.) when stages $B_7$, $B_8$, are "1" then the frequency is equal to or below 416 c.p.s. and if at the same time $B_5$ is "1" then the frequency is equal to 384 or less. Therefore when binary stages $B_5$, $B_7$, $B_8$ are all simultaneaously "1" or have reached this count then the frequency is below the limit of −16 c.p.s. By sampling the condition of these stages when or before the reset occurs an indication in the form of a pulse can be obtained to provide a low frequency error. The sampling of these individual logic circuit conditions is accomplished by connecting the output of stages $B_7$ and $B_8$ to AND circuit 223 which comprises diodes 224 and 225 so that an output pulse appears at 226 when both $B_7$ and $B_8$ are "1." This output is concurrently applied to diode 227 of AND circuit 228 and diode 229 of AND circuit 230. A tolerance signal B appears on line 231 when the main generator is in the circuit, as previously described, for providing a tolerance of ±16 per second.

This signal or voltage is applied to diode 232 of AND circuit 233. The output of binary stage $B_5$ is applied to diode 234 of AND circuit 228 so that with an output at 226 ($B_7+B_8$="1") and $B_5$ in the "1" state, an output plus appears on line 235. With the tolerance signal "B" at diode 232 and the output pulse of line 235 at diode 236 and output pulse appears on low frequency detector line 237 indicating a frequency of less than 384 c.p.s. at the main or normal generator. This output signal is then applied as hereinbefore described.

The reset output is applied from line 222 through diodes 238 concurrently to the individual counters. Under this condition the counters are all reset or brought to the "0" state for each cycle of the power generator frequency and if by this time the accumulated count has reached 416 then an output pulse appears at 236 and will continue to appear periodically until the condition is corrected or a different tolerance signal is applied. It should be noted that where no or limited tolerance signal is present no low frequency indications output pulse is present.

When the auxiliary generator has been switched into operations across the main lines when the tolerance signal appears at line 239 and is applied to diode 240 of AND circuit 241. As an example, if the frequency tolerance were to change to ±8 c.p.s. then from FIG. 3 in addition to $B_7$ and $B_8$ being "1" both $B_3$ and $B_4$ must also be in the "1" state. The output of counter $B_3$ is applied by line 242 to diode 243 of AND circuit 230 which effectively provides an output at 244 when $B_3$, $B_7$, and $B_8$ are all "1." This output pulse at 244 is applied to AND circuit 245 as is the condition of binary $B_4$ on line 246. Therefore when stages $B_3$, $B_4$, $B_7$ and $B_8$ are all "1" and a tolerance signal is present at 239 an output pulse will be present at the output of AND circuit 241 as well as on line 239. This indicates a low frequency error of 8 c.p.s. or more. Summarizing the low frequency operation it is clear that the number of clock pulses that are counted for the period of the main generator frequency is an indication of its frequency. In other words if the particular count *is* reached within the period then a low frequency error is indicated by way of a pulse. If the count is not reached there is no output.

Considering now the detection of high frequency error, it must be realized that under the same detection system a high frequency error would be in the form of a lower count which would be reached during the period even if the frequency were correct and therefore the absence of an output pulse must be used to generate a failure indication. Referring again to the table of FIG. 3, it is clear that if the frequency is above 416 cycles/sec. then binary $B_7$ will be in the "0" condition. On the other hand if the $B_7$ and $B_8$ binary are "1" then the frequency is not too (+16 c./s.) high. The failure to produce a "1" at $B_7$ indicates a frequency higher than 416 c.p.s.

The output of AND circuit 223 ($B_7+B_8$) is applied via line 247 to diode 248 of AND circuit 249 while the other diode 250 is provided with tolerance signal "B." The output of circuit 249 is applied through diode 251 to the base 252 of transistor 253 of flip-flop 254. An output is only provided at this transistor base when a proper frequency is monitored and no signal when the frequency is above high tolerance. With a proper frequency and a tolerance signal B the output pulse to its base makes transistor 253 conduct and therefore supplies no output at the collector 254′ or line 255 or cuts it off if it is providing an output. A gate pulse inphase with the monitored signal is supplied from transistor 212 via line 214 to the base 256 of the other transistor 257. This input while making transistor 257 conduct also cuts off transistor 253 to provide an output at line 255. Summarizing the operation, at the start of the monitored frequency cycle which starts with the reset pulse signal, the binary stages commence counting and the flip-flop 254 is turned to provide an output at 255 by an inphase pulse input at base 256. This output remains until a count for a proper frequency is reached at which time the input pulse at base 252 flips 254 so as to provide no output and no high frequency indication pulse is generated. On the other hand, if the frequency is too high then since $B_7$ will not go to "1," no input at base 252 will cut off the flip-flop output. It is necessary to ascertain whether or not the proper count has been reached at the time of the next reset and for this purpose AND type circuit 258 is provided. The output of flip-flop is applied to diode 259 and a phase reversed pulse is supplied to diode 260 by line 214. This arrangement permits a sampling of the flip-flop 254 condition for each reset. Its condition (i.e. an output pulse) appears on line 261 periodically.

The above description and embodiment is operative for a tolerance of +16 c.p.s. Examination of FIG. 3 discloses that if the tolerance were reduced to +8 c.p.s. then if stages $B_7$, $B_8$ and $B_3$ simultaneously become "1" before the count is recycled this tolerance is attained. For this purpose AND circuit 262 is provided with the tolerance signal "A" supplied to diode 263 thereof. The other diode 264 receives a pulse from AND circuit 230 which has an output only when $B_7$, $B_8$ and $B_3$ are "1" as described hereinbefore. Since tolerance signals "A" and "B" never coexist then the base 252 of transistor 253 receives an input only from one or the other of the two AND circuits 249 and 262 when the monitored frequency is within the limits set forth.

In the high frequency detection the absence of a pulse must be used to generate a failure indication since a continuous train of pulses are produced whenever the frequency is less than the high frequency limit but cease when the frequency exceeds a selected limit. From the table of FIG. 3, it is evident that as long as the outputs of binaries $B_7$ and $B_8$ are "1," the frequency monitored is less than 416 c.p.s. If $B_7$ is "0" the count is less than 384 and the frequency is 416 c.p.s. or greater. Employing this relationship, a pulse appears at the input to transistor 253 through AND circuits 223 and 249 or circuits 230 and 262 depending on the tolerance signal, when $B_7$ and $B_8$ or $B_7$, $B_8$ and $B_3$ are "1." Flip-flop 254 is also fed by a signal from line 214 which is inphase with the monitored frequency. This signal sets the state of the flip-flop 254 to deliver an output on line 255 while the signal at the base 252 changes the state of the flip-flop to remove the output signal at 255. As long as the state of binary $B_7$ is "1," the signal at base 252 continues to reset the output of the flip-flop 254 to zero or no output every time that the signal at line 214 sets the flip-flop to provide an output signal. If no signal appears at base 252 due to the failure of the counter to reach a count of 384 (or 392 depending on tolerance limit) the flip-flop is not reset to zero and the output appears on line 255. Lines 217 and 255 are connected to the AND circuit 258 so that whenever a voltage appears at the output of the flip-flop and simultaneously one on the phase shifted gate pulse of line 217 an output appears at line 261.

It will be understood that various changes in the details, materials, and arrangements of parts (and steps), which have been herein described and illustrated in order to explain the nature of invention, may be made by those skilled in the art within the principle and scope of the invention as expressed in the appended claims.

We claim:

1. A frequency error detector for producing an output pulse as an indication of a frequency in excess of a selected frequency value of an A.C. signal being monitored which comprises:

phased pulse source means for generating a series of inphase pulses, 180° out of phase pulses and reset pulses derived from said monitored A.C. signal, clock pulse generator for producing a series of pulses at a repetition rate greater than the frequency of said monitored signal, a binary counter having a plurality of tandem stages each having output of "0" and "1" and capable of counting the lowest frequency to be monitored having its input connected to the output of said clock generator, reset means for resetting said stages connected to receive said reset pulses whereby said counter will be reset for every cycle of said monitored signal, a first logic "and" circuit means, said first logic "and" means inputs connected to receive the outputs of those stages of said counter which are "1" for said selected frequency value and one of said those stages is "0" for the next higher frequency count whereby said first "and" means will produce an "1" output at a count indicating said selected frequency and a "0" output for all frequencies greater than said selected frequency, a bistable device capable of assuming a pair of stable output states "1" and "0" dependent on the inputs thereto having an output and a pair of inputs wherein an input pulse at the first input produces an output state "1" and an input at the second input produces an output state "0,"

said inphase pulses of said phased means connected to said first input and the output said first "and" means connected to said second input of said bistable device, second "and" circuit means having a pair of inputs and an output, said output of said bistable device and said 180° out of phase pulses of said phased means connected to said pair of inputs, whereby an output signal will be produced at said output of said second "and" means for each cycle of said monitored signal where the frequency of said monitored signal exceeds said selected frequency.

2. The detector according to claim 1 wherein said phased pulsed means includes in series tandem connection a squarer, a phase shifter and a pulse shaper.

3. The detector according to claim 2 wherein said bistable device is a flip-flop circuit.

4. A frequency error detector for producing an output pulse as an indication of a frequency in excess of a first and second selected frequency value of a monitored A.C. signal which comprises:

phased pulse source means for generating a series of inphase pulses, 180° out of phase pulses and reset pulses derived from said monitored A.C. signal, clock pulse generator for producing a series of pulses at a repetition rate greater than the frequency of said monitored signal, a binary counter having a plurality of tandem stages each having an output of "0" and "1" and capable of counting the lowest frequency to be monitored having its input connected to the output of said clock generator, reset means for resetting said stages connected to receive said reset pulses whereby said counter will be reset for every cycle of said monitored signal, a first logic "and" circuit means, said first logic "and" means inputs connected to receive the outputs of those stages of said counter which are "1" for the first selected frequency value and one of said those stages is "0" for the next higher frequency count, a second logic "and" circuit means, said second logic "and" means inputs connected to receive the outputs of those stages of said counter which are "1" for the second selected frequency value, a bistable device capable of assuming a pair of stable output states "1" and "0" dependent on the inputs thereto having and output and a pair of inputs wherein an input pulse at the first input produces an output state "1" and an input at the second input produces an output state "0,"

a third "and" circuit having one input connected to receive the output of said first "and" circuit means, a fourth "and" circuit means having one input connected to receive the output of said second "and" circuit means, means for applying a tolerance signal to one of the other inputs of said third and fourth "and" circuits for selecting the said first and second frequency values, said inphase pulses of said phased means connected to said first input and the outputs of said third and fourth "and" circuit means connected to said second input of said bistable device, fifth "and" circuit means having a pair of inputs and an output, said output of said bistable device and said 180° out of phase pulses of said phased means connected to said pair of inputs, whereby an output signal will be produced at said output of said fifth "and" means for each cycle of said monitored signal where the frequency thereof exceeds one of the first and second selected frequencies dependent on which "and" circuit receives said tolerance signal.

5. The detector according to claim 4 wherein said bistable device is a flip-flop circuit.

References Cited

UNITED STATES PATENTS

| | | | |
|---|---|---|---|
| 2,992,384 | 7/1961 | Malbrain. | |
| 3,187,202 | 6/1965 | Case | 328—134 X |
| 3,206,684 | 9/1965 | Der et al. | 328—134 X |
| 3,219,935 | 11/1965 | Katakami | 328—134 X |
| 3,312,780 | 4/1967 | Hurst et al. | 328—134 X |

JOHN S. HEYMAN, *Primary Examiner.*

U.S. Cl. X.R.

307—229, 233, 293, 291; 328—134